United States Patent Office
3,497,485
Patented Feb. 24, 1970

3,497,485
ACRYLOXYALKYLOXYALKYL KETIMINES AND ALDIMINES, POLYMERS THEREOF, PRIMARY AMINE MONOMERS AND POLYMERS, AND PROCESSES FOR PRODUCING THE MONOMERIC AND POLYMERIC IMINES AND AMINES
William D. Emmons, Huntingdon Valley, Pa., assignor to Rohm & Haas Company, Philadelphia, Pa., a corporation of Delaware
No Drawing. Filed Sept. 7, 1965, Ser. No. 485,591
Int. Cl. C08f 3/84
U.S. Cl. 260—86.1                22 Claims

ABSTRACT OF THE DISCLOSURE

In accordance with the present invention, novel monomeric ketimines and aldimines are produced having the general formula:

(I)     $H_2C=C-(CH_2)_{m-1}H$
              $|$
              $CO-(D)_{n''-1}-(B)_{n'-1}-(A')_{n-1}-N=Q$ wherein:
Q is selected from the group consisting of $$=C\genfrac{}{}{0pt}{}{R^1}{R^2}, \quad =C-(CHR)_x\rceil, \text{ and } =CHR_3$$

R is H or it may be methyl in one CHR unit,
$R^1$ is selected from the group consisting of $(C_1-C_{12})$-alkyl and cyclohexyl groups,
$R^2$ is selected from the group consisting of $(C_1-C_{12})$-alkyl and cyclohexyl groups,
$R_3$ is selected from the group consisting of phenyl, halophenyl, $(C_1-C_{12})$alkyl, cyclohexyl, and $(C_1-C_4)$alkoxyphenyl groups,
A', B, and D are the same or different oxyalkylene groups having the formula $$-O-\underset{|}{\overset{R°}{C}}H-\underset{|}{\overset{R°}{C}}H-$$

R° being individually selected from the group consisting of H and alkyl radicals having 1 to 2 carbon atoms,
m is an integer having a value of 1 to 2,
x is an integer having a value of 4 to 5,
n is an integer having a value of 1 to 200,
n' is an integer having a value of 1 to 200, and
n'' is an integer having a value of 1 to 200, the sum of $n-1$, $n'-1$, and $n''-1$ having a value of 2 to 200.

Preferred compounds are those of the Formula I in which the sum of $n-1$, $n'-1$, and $n''-1$ have a value of 2 to 10.

The polymers and copolymers of the Formula I monomers may be used in the formation of coatings, impregnants, and adhesives for paper, textiles, leather, wood and metals.

---

United States Letters Patent 3,037,969, June 5, 1962, discloses the production of acryloxyalkylketimines, acryloxyalkylaldimines, polymers thereof, and amine hydrolysis products of both monomers and polymers. The most practical of these ketimines and aldimines are those in which the alkyl group joining the acryloxy oxygen to the imine nitrogen has 2 to 3 carbon atoms, extending in a chain between the oxygen and nitrogen atoms. However, the primary amine-containing groups obtained by hydrolysis of the imine monomer or polymer are converted into neutral amide groups which lack valuable properties of the basic amine group. This conversion, which may be termed an intramolecular "flip-flop" occurs very rapidly at neutral to alkaline conditions and may be typically represented by the following equation:

$$R-\overset{O}{\underset{||}{C}}-OANH_2 \longrightarrow R-\overset{O}{\underset{||}{C}}-\underset{|}{\overset{H}{N}}-A-OH$$

wherein R may represent either the vinyl or alpha-methyl vinyl group in the case of the monomers or the polymer residue in case of the polymers, and A is the lower alkyl group of 2 to 3 carbon atoms. This "flip-flop" may be avoided by using the monomeric imines, or polymers thereof, having at least 4, and preferably at least 7, carbon atoms in a chain extending from the ester oxygen to the imine nitrogen but these compounds are comparatively expensive not only because of the higher cost of the aminoalcohols from which they are made but also because of the greater care and trouble involved in preparing them from the aminoalcohols.

In accordance with the present invention, novel monomeric ketimines and aldimines are produced having the general Formula I as defined in the abstract hereof. A simpler definition of this group of compounds is by the following Formula I-A:

$$H_2C=\underset{|}{\overset{R''}{C}}-\overset{O}{\underset{||}{C}}-(OA)_p-N=Q$$

wherein:
R'' is H or methyl,
Q is $$=C\genfrac{}{}{0pt}{}{R^1}{R^2}, \quad =C-(CHR)_x\rceil, \text{ or } =CHR^3$$

R is H or, in one CHR unit, it may be methyl,
$R^1$ is a $(C_1-C_{12})$alkyl or cyclohexyl group,
$R^2$ is a $(C_1-C_{12})$alkyl or cyclohexyl group,
$R^3$ is a $(C_1-C_{12})$alkyl, cyclohexyl, phenyl, halophenyl, or a $(C_1-C_2)$alkoxyphenyl group,
$(OA)_p$ is a chain of 2 to 200 oxyalkylene groups OA of the formula $$-O-\underset{|}{\overset{R°}{C}}H-\underset{|}{\overset{R°}{C}}H-$$

R° being H or a $(C_1-C_2)$-alkyl group, in which chain R° may be the same throughout its length or R° may be H in some of the OA groups and an alkyl group in others.

Preferred compounds are those of the Formula I in which the sum of $n-1$, $n'-1$, and $n''-1$ have a value of 2 to 10 i.e., those of Formula I-A wherein p is 2 to 10.

The compounds designated hereinabove may be prepared by the transesterification of an ester or acrylic acid or methacrylic acid, such as methyl methacrylate or methyl acrylate, with a hydroxy compound of the formula $$H-(D)_{n''-1}(B)_{n'-1}-(A')_{n-1}-N=Q \quad (II)$$

or, in simpler terms, of the formula $$H-(OA)_p-N=Q \quad (II-A)$$

the symbols being as defined above. The compounds of Formula II or II-A may be designated as Schiff bases and the production thereof is disclosed in U.S. Patent 3,110,732. The aforementioned transesterification reaction is effected under alkaline conditions in the presence of about ½ to 10% by weight, and preferably 1 to 5%, based on the weight of the starting materials, of a tetraalkyl titanate, such as the tetraisopropyl or tetrabutyl titanate. No solvent is needed. While the starting materials may be employed in stoichiometrically equivalent amounts, it is preferred that the ester be employed in excess. The alcohol liberated during the transesterification is removed by azeotropic distillation of a mixture of the alcohol and the starting monomeric ester, such as methyl methacrylate or methyl acrylate. It is desirable that a polymerization inhibitor be employed such as para-hydroxydiphenylamine or diphenylphenylenediamine. The reaction is generally carried out at temperatures of about 100° to 130° C. and the completion of the reaction can be determined by measuring the amount of alcohol removed and thereby determining when the theoretical amount of alcohol liberated has been taken out of the system by distillation.

Instead of using tetraalkyl titanate, the transesterification may be carried out in the presence of an alkali metal alkoxide, the amount thereof varying from 0.2% to 5%, preferably 1 to 3%, by weight, based on the weight of the starting materials. Whereas the use of tetraalkyl titanate is applicable to the preparation of both acrylates and methacrylates, the alkali metal alkoxide system is applicable primarily for the transesterification of methacrylates. Sodium methoxide or ethoxide as well as the potassium and lithium analogs may be employed. In this system, the ester and ketimine or aldimine are mixed and a solution of the alkoxide in an alcohol such as methanol is added gradually. No additional solvent is needed, the ester itself serving this purpose. The temperature may be from 100° to 140° C. and is preferably not over 130° C.

As described in 3,110,732, alkanolamines, such as monoethanolamine, 1-amino-2-propanol, 2-amino-1-propanol, 3-amino-1-propanol, 2-(2-aminoethoxy)ethanol, 1-amino-2-butanol, 2-amino-3-butanol and the like are first condensed with an aldehyde or ketone to form a Schiff base therefrom. Besides the aldehydes and ketones mentioned in column 2, lines 37 to 41, of this patent, methylcyclohexanone and those mentioned in 3,037,969 may be used. The resulting imine in effect has the nitrogen atom blocked so that the alkylene oxide reacted in the next step can only condense with the alcoholic hydroxyl, thereby producing the imines of Formula II or II–A hereinabove.

The monomers of the present invention, having Formula I or I–A hereinabove, are colorless to yellow liquids and are reasonably stable at room temperature although if they are to be stored over long periods of time, it is advisable to maintain them under refrigeration. These monomers are characterized by two points of reactivity, one being the double bond in the acrylyl portion of the molecule by virtue of which the compounds are adapted to polymerize by the typical vinyl addition process to form linear polymers and copolymers. The double bond linkage of the imine group is hydrolyzable under acid conditions to form a novel primary amine salt which is polymerizable.

The hydrolyzed monomers are salts of amines having the general formula

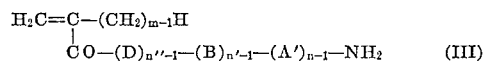

(III)

or of the formula

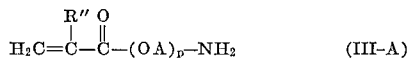

(III–A)

wherein the symbols are as defined hereinabove. These monomers do not undergo conversion to a neutral hydroxyl-containing acrylamide or methacrylamide nor do the polymers obtained from Formula III or III–A or by hydrolysis as described hereinafter, of the polymers of a compound of Formula I or I–A. The presence of the basic primary amine group in such polymers provides therein the characteristic of outstanding adhesion to a wide variety of substrates, such as bare metals, including steel, aluminum, bronze, and copper, also metals primed with conventional commercial primers based on aminoplast condensates, such as urea-formaldehyde, melamine-formaldehyde, phenol-formaldehyde condensates and their alkylated, such as methylated to butylated derivatives, on alkyd resins, especially oil-modified resins, vic-epoxy resins, and mixtures of these several types of coating compositions. Furthermore, the fact that the polymers are not subject to the intramolecular "flip-flop" mentioned heretofore assures the permanent retention of the high degree of adhesion provided by the basic primary amine group. Thus copolymers containing ½% to 15% by weight of an imine of Formula I or I–A or of an amine of Formula III or III–A may be used as an automotive lacquer, either as a prime, intermediate, or topcoat or for any two or all of these coats. They may also be used as lacquers or enamels on household appliances, such as stoves, refrigerators, and the like.

The amines of Formula III or III–A more or less rapidly undergo a Michael addition reaction unless they are stabilized by conversion to a salt form. While any acid or acid salt may be used for converting the amine to salt form it is preferred, from the standpoint of stability against Michael addition, that a reasonably strong acid be used for forming the salt of the amine of Formula III or III–A. Thus it is preferable that the acid be one whose $pK_A$ is not over 3. When reference is made to the polymerization of the hydrolyzed monomer herein, it is to one of the preferred salts that is meant or intended since they are readily polymerized by vinyl addition polymerization without interference by virtue of Michael addition.

Once the amine salts are polymerized, the polymers can be neutralized by means of bases such as an alkali metal hydroxide or amonium hydroxide to produce the free base form of the polymers. Alternatively, the acid may be removed from the polymer salt by treatment with an anion exchange resin.

Thus as will appear hereinafter, there are two ways in which polymers containing primary amine groups in free base form can be obtained in accordance with the present invention. The first is that just described wherein an amine salt of Formula III or III–A is polymerized and a polymer is then neutralized to free base form. The second is to polymerize an imine of Formula I or I–A, hydrolyze the resulting polymer to form the polymer containing a primary amine or its salt depending on whether acid is present during the hydrolysis, and, in the latter instance, treating the polymer amine salt with an ion exchange resin or neutralizing to liberate the free amine form of the polymer.

The polymers containing an amine of Formula III or III–A may be used in either neutral, acid, or basic form or under any of those conditions.

Aqueous dispersions of copolymers containing ½ to 15% or more (by weight) of an amine of Formula III or III–A obtained by emulsion copolymerization either of an imine of Formula I or I–A or of an amine/salt of Formula III or III–A with at least one other monoethylenically unsaturated monomer having a group of the formula $H_2C=C<$ can be formed into water base paints which adhere well to a wide variety of substrates such as wood, either bare or carrying a fresh or a weatherbeaten prior coat or paint, concrete, asbestos, cement shingles, stucco, concrete and cinder blocks, bricks, stones, and so forth.

This hydrolysis of imine groups to primary amine groups may be effected on a polymer of the unsaturated imine yielding an amino(alkoxy)$_n$alkyl acrylate or methacrylate polymer in which the amine group contains a primary nitrogen atom. Such novel acrylate and methacrylate polymers carrying a primary nitrogen atom attached to a carbon atom and having two hydrogen atoms attached to it have been prepared for the first time by the present invention, and these polymers are part of the invention herein claimed.

The monomeric compounds of Formula I or I–A may be suspended in an aqueous medium preferably in particulate form and upon acidification of the medium such as by means of acetic acid, phosphoric acid, sulfuric acid, and the like, the monomer is hydrolyzed to a primary amine which forms a salt of the acid present. This salt is polymerizable in aqueous systems. Thus, it may be dissolved in water and polymerized by water-soluble initiators or catalysts, such as ammonium persulfate, optionally with a reducing agent, such as potassium metabisulfite in a redox system. Such polymers have high molecular weight and are applicable as a wet-strength resin in paper and for the flocculation of suspended matter in aqueous media to facilitate filtration, settling, and/or decantation.

The polymers and copolymers of the ketimines or aldimines of Formula I or I-A may be prepared by either a bulk, a solvent, or an aqueous emulsion technique using, in the case of solution polymerization, organic solvents such as benzene, toluene, xylene, acetone, dioxane, dimethylformamide, and acetonitrile, and azo catalysts such as diazodiisobutyronitrile and dimethyl-$\alpha,\alpha'$-azodiisobutyrate. The propotrion of azo catalyst or initiator may be between 0.1% and 5% and is preferably between about 0.5% and 1.5%, on the weight of the total polymerizable materials.

The compounds of Formula I or I-A can be copolymerized with various other ethylenically unsaturated monomers, and especially monoethylenically unsaturated monomers adapted to produce linear copolymers. Thus, copolymers may be made containing from about 0.5% to 99.5% by weight of a compound of Formula I or I-A with at least one of the following monomers: vinyl acetate, acrylonitrile, acrylamide, methacrylamide, styrene, vinyltoluene, vinylidene chloride, vinyl chloride, vinyl laurate, esters of acrylic acid or methacrylic acid having from 1 to 18 carbon atoms in the alcohol moiety such as methyl methacrylate, methyl acrylate, ethyl acrylate or methacrylate, 2-ethylhexyl acrylate or methacrylate, dodecyl acrylate or methacrylate, and octadecyl acrylate or methacrylate.

The polymers and copolymers may be used in the formation of coatings, impregnants, and adhesives for paper, textiles, leather, wood and metals. Copolymers containing from 5 to 25% by weight of the unsaturated ketimine or aldimine of the invention can be mixed with polyepoxides for the production of insoluble and infusible cross-linked coatings. The copolymers may be employed in conjunction with other polymeric material for the production of special compositions for special uses. For example, copolymers prepared by the polymerization of an imine of Formula I or I-A in the presence of glue results in a polymer which is soluble in water and serves sufficiently for the flocculation of suspended matter of either organic or inorganic material in aqueous media to facilitate the filtration or the settling and decantation of the system. Emulsion polymers of an imine of the present invention are useful also for the binding of pigments, for the stabilization of wool fabrics against shrinkage on laundering, and for the binding of fibers in non-woven fabrics. For this purpose, they may be used in conjunction with a polyepoxide of water-soluble or dispersible character. The bonded non-woven fabrics have good to excellent wash-resistance.

Examples of epoxides that may be employed include both water-dispersible and/or organic solvent-soluble types such as the "ethoxyline resins" available under the trade names of Epon or Araldite resins. They are polyether derivatives of a polyhydric phenol containing epoxy groups and may be prepared by effecting reaction between a polyhydroxyphenol or alcohol, for example, hydroquinone, resorcinol, glycerine, or condensation products of phenols with ketones, for instance, bis-(4-dihydroxydiphenyl)-2,2-propane, and epichlorohydrin.

The polymers of the imines can be treated with an acid, such as acetic acid or phosphoric acid, while suspended in water to effect hydrolysis of the imine group to primary amine nitrogen groups. This is a very rapid reaction even at room temperature, but in some cases, it may be accelerated by raising the temperature. The polymers thereby obtained have uses similar to those of the unhydrolyzed imine. They are useful for the making of adhesives and coatings of thermosetting character, especially when mixed with epoxides, binders for non-woven fabrics and for pigments in the pigment-dyeing and printing of textiles, and as lubricating oil additives having sludge dispersing qualities, for improving the viscosity and index and pour point characteristics. They may be used for the stabilization of wool against shrinkage on washing and for the imparting of wet-strength to paper. These polymers may also be used in the paper industry as beater deposition aids wherein they serve as anchoring agents for adhering all sorts of sizing, filling, and finishing materials for paper, such as mineral pigments and fillers, rosin sizes, rubber latices, and synthetic emulsion polymer dispersions, such as of polyvinyl acetate, polyethyl acrylate, etc. and as pigment retention aids in the filling of papers. They are also useful as flocculating agents to clarify, facilitate settling in, and to speed up filtration of, aqueous suspensions of both organic and inorganic matter including sewages and domestic and industrial wastes of all types.

To assist those skilled in the art to practice the present invention, the following modes of operation are suggested by way of illustration, parts and percentages being by weight, pressures being in millimeters of mercury, and the temperatures in ° C. unless otherwise specifically noted.

(A) PREPARATION OF N-(1,3-DIMETHYLBUTYLIDENE)-2-(2-HYDROXYETHOXY)-ETHYLAMINE

Into a 2 l. three-necked flask equipped with a mechanical stirrer, a thermometer and a Dean-Stark trap with condenser and drying tube is placed a solution of 600 g. (6.0 moles) of methyl isobutyl ketone (B.P. 116° $n_D^{26}$ 1.3931) and 315.3 g. (3.0 moles) of diglycolamine (i.e. 2-(2-hydroxyethoxy)-ethylamine). The solution is refluxed with stirring for four hours during which time the required 54 ml. (3.0 moles) of water is collected. The excess ketone is removed by distillation under reduced pressure affording 577.4 g. of a slightly yellow liquid. Gas-liquid chromatographic (G.L.C.) analysis reveals approximately 94–5% purity representing a yield of 96–7%. Subsequent distillation under reduced pressure, allowing a 55.8 g. forerun, gives 478.2 g. of a water white liquid, boiling range of 84–7°/0.10 mm., $n_D^{26}$ 1.4586, which analyzes (G.L.C.) 98–99% pure. Titration with perchloric acid in glacial acetic acid gives an equivalent weight of 187.2 (calc'd, 187.3).

*Analysis.*—Calc'd for $C_{10}H_{21}NO_2$: C, 64.12%; H, 11.30%; N, 7.48%. Found: C, 64.02%; H, 11.45%; N, 7.38%.

(B) PREPARATION OF N-(BENZYLIDENE)-2-(2-HYDROXYETHOXY)-ETHYLAMINE

A solution of 222.8 g. (2.10 moles) of benzaldehyde, 210.2 g. (2.00 moles) of diglycolamine and 200 ml. of benzene is heated to reflux employing essentially the same equipment described in (A) above. Over a 3-hr. period the required 36 g. (2.0 moles) of water is collected. The benzene and excess benzaldehyde are removed under reduced pressure. The remaining liquid is distilled through a 6-inch Vigreaux column affording 362.6 g. (93% yield based on G.L.C. analysis) of a slightly yellow liquid, B.P., 131°/0.5 mm.; $n_D^{26}$, 1.5504; equivalent wt.

(HClO$_4$/HOAc)

195 (calc'd, 193.3). Analysis by G.L.C. shows 99% purity.

*Analysis.*—Calc'd for $C_{11}H_{15}NO_2$: C, 68.37%; H, 7.82; N, 7.25%. Found: C, 68.45; H, 7.80%; N, 7.14%.

(C) REACTIONS OF POLYGLYCOLAMINES WITH METHYLISOBUTYL KETONE (a) A solution of 500 g. (1.0 mole) of a polyglycolamine of the formula $H(OCH_2CH_2)_nNH_2$, having an apparent molecular weight of 500 (average $n$, 11), 100 g. (1.0 mole) of methyl isobutyl ketone and 200 ml. of benzene is heated to reflux, employing the apparatus described in (A) above. Over a 3.25-hr. period 9.0 ml. of water is collected. The benzene is removed by distillation until a solution temperature of 135° (head, 90) is obtained. Additional ketone (100 g., 1.0 mole) is added and reflux is continued. An additional 9.5 g. (total wt. 17.5 g. (97%)) of water is collected over an 8.75-hr. period. The reaction solution is stripped (150°/0.25 mm.) to a constant weight of 560.7 g. (96% yield) of the N-(1,3-dimethylbutylidene)-polyglycolamine product having $n_D^{26}$, 1.4667; equivalent wt. ($HClO_4/HOAc$), 580 (calc'd, 582).

Analysis.—Calc'd for $C_{23}H_{57}NO_{11}$: C, 57.61%; H, 9.84%; N, 2.40%. Found: C, 56.03%; H, 9.73%; N, 2.48%.

(b) A solution of 505 g. (1.0 mole) of a polyglycolamine of the formula

having an apparent molecular weight of 505 (average $n$, 7.4) and 200 gm. (2.0 moles) of methyl isobutyl ketone is heated to reflux employing the apparatus described in (A) above. Over a 3.5-hr. period 17.5 g. (97%) of water is collected. The reaction solution is stripped under reduced pressure (0.2 mm.) to a maximum temperature of 152°, affording 544.5 g. (93% yield) of an orange colored liquid N-(1,3-dimethylbutylidene)-polyglycolamine product having $n_D^{26}$, 1.4515; equivalent wt.

($HClO_4/HOAc$)

557 (calc'd, 587.6).

Analysis.—Calc'd for $C_{31.2}H_{63.5}NO_{8.4}$: C, 63.8%; H, 10.9%; N, 2.38%. Found: C, 61.7%; H, 10.5%; N, 2.55%.

(c) A solution of 200 g. of a polyglycolamine of the formula $H(OCH_2CH_2)_nNH_2$, having an apparent molecular weight of 3007 ($n=68$) and 100 g. (1.0 mole) of methyl isobutyl ketone is heated to reflux for 4 hrs. Approximately 1.0 ml. of water is obtained. The excess ketone is removed under reduced pressure yielding 197.6 g. of N-(1,3-dimethylbutylidene)-polyglycolamine product as a brown colored wax. Titration ($HClO_4/HOAc$) gives an equivalent weight of 3292 (calc'd, 3089).

Analysis.—Calc'd for $C_{142}H_{285}NO_{68}$: C, 55.1%; H, 9.28%; N, 0.45%. Found: C, 53.9%; H, 9.17%; N, 0.53%.

(D) REACTION OF POLYGLYCOLAMINE WITH BENZALDEHYDE

A solution of 206 g. (0.20 mole) of a polyglycolamine, , having an apparent molecular weight of 1028 ($n=17.5$) 22.2 g. (0.21 mole) of benzaldehyde and 100 ml. of toluene is heated to reflux using the apparatus described in (A) above. Over a three-hour period, 3.0 ml. (83%) of water is collected (2.8 ml. at the end of 1.0 hr.). The reaction solution is stripped under reduced pressure to 160° (max.) 0.25 mm. affording 220.8 g. (98% yield) of N-(benzylidene)-polyglycolamine product as a viscous dark colored liquid; $n_D^{26}$, 1.4644; equivalent wt.

($HClO_4/HOAc$)

1119. (calc'd, 1118).

Analysis.—Calc'd for $C_{59.5}H_{112}NO_{17.5}$: C, 63.7%; H, 10.1%; N, 1.25%. Found: C, 63.6%; H, 9.94%; N, 1.35%.

Preparation of N-(1,3-dimethylbutylidene)-2-(2-methacryloxyethoxy)-ethylamine (1) A solution of 187.3 g. (1.0 mole) of N-(1,3-dimethylbutylidene) - 2 - (2 - hydroxyethoxy)-ethylamine (Example A), 500 g. (5.0 mole) of methyl methacrylate, 2.60 g. (10.0 mmoles) of N,N'-diphenyl-p-phenylenediamine is charged to a one-liter, 3-necked flask equipped with a mechanical stirrer, a gas inlet (a long hypodermic needle, inserted through a rubber septum and extending into the solution), and a Y-tube adapter fitted with a thermometer (extending into the reaction solution) and a 12-inch Vigreaux column. The column is surmounted with an isothermal distillation head which is equipped with a drying tube and a graduated receiver.

The solution is heated to reflux and 25 ml. of distillate is collected. Tetraisopropyl titanate, 3.0 ml. (2.84 g., 10.0 millimoles) is added and reflux continued. The distillate, B.P. <80°, is collected (allowing 50% take-off) over the first two hours and B.P. <90°, over the third hour. No temperature limit is set for the fourth hour (maximum solution temperature, 115°). A total of 178 ml. of distillate is collected. The reaction solution is stripped at 125°/50 mm. and then distilled at 200°/0.75 mm. using a wiping film still; there is obtained 237.3 g. (78% yield based on analysis) of liquid containing approximately 84% of the N-(1,3-dimethylbutylidene)-2-(2-methacryloxyethoxy)-ethylamine product as determined by G.L.C. analysis. Subsequent fractionation using a wiping film still yields 184.3 g. of this ester product as a colorless liquid, $n_D^{26}$, 1.4562 and of approximately 93–5% purity (G.L.C.). Titration ($HClO_4/HOAc$) gives an equivalent weight of 260.7 (calc'd, 225.4). The infrared and N.M.R. spectra are consistent with the expected structure.

Analysis.—Calc'd for $C_{14}H_{25}NO_3$: C, 65.84%; H, 9.87%; N, 5.49%. Found: C, 65.70%; H, 9.87%; N, 5.41%.

(2) Into the same apparatus as described in (1) above a solution of 500 g. (5.0 moles) of methyl methacrylate. 187.3 g. (1.0 mole) of N-(1,3-dimethylbutylidene)-2-(2-hydroxyethoxy)-ethylamine, 4.0 g. of bis-(p-hydroxyphenyl)amine and 2.2 gms. (0.54 g. or 10 millimoles of $NaOCH_3$) of a 25% methanolic solution of sodium methoxide is brought to reflux. The distillate, B.P. <85°, is collected over a three-hour period. After the first hour an additional 1.1 g. (5.0 millimoles of $NaOCH_3$) of sodium methoxide solution is added to the reaction solution. A total of 162.6 g. of distillate is obtained which, based on refractive index, contains 34.5 g. of methanol (calc'd, 34.4 g.). One-half of the reaction solution is stripped at 40°/15 mm., producing 175.7 g. of crude product. This is flash distilled at 250°/0.75 mm. The resulting distillate is distilled through a four-inch Vigreaux column affording 77.8 g. of material, B.P. 95°/0.3 mm., $n_D^{26}$ 1.4571. The latter of these operations is similarly performed on the remaining portion of the reaction solution yielding 74.5 g. of material, B.P. 95–105°/0.3 mm. Gas-liquid chromatographic analysis of both materials show 97% purity. The infrared spectra of both materials are consistent with the expected structure. Titration ($HClO_4/HOAc$) of the former material shows an equivalent weight of 256.0 (calc'd, 255.4). Elemental analysis of the latter material gives the following results:

Analysis.—Calc'd for $C_{14}H_{25}NO_3$: C, 65.84%; H, 9.87%; N, 5.49%. Found: C, 65.81%; H, 10.09%; N, 5.48%.

(3) Preparation of N - (benzylidene) - methacryloxyethoxyethylamine.—A solution of 193.2 g. (1.0 mole) of N-(benzylidene)-diglycolamine (e.g. product of (B) above), 500 g. (5.0 mole) of methyl methacrylate, 0.6 g. of p-methoxyphenol and 2.0 g. of bis-(p-hydroxyphenyl) amine is heated to reflux using the apparatus described in (1) above. After 27 ml. of distillate is collected 5.2 g. of tetraisopropyl titanate is added. The mixture is then heated under total reflux for 1.5 hours. Over the next 6.0 hours 138 g. of distillate, B.P. <90° is collected. This is followed by 12 g. of distillate, B.P. <95°, collected over a 35-minute interval and 75 ml., B.P. 95–102°, over a 45-minute period; the final solution temperature is 119°.

The solution is stripped at 100°/40 mm., using a wiping film still. Subsequent distillation of the crude product at 200°/0.75 mm. provides 245.2 g. (92% yield based on G.L.C. analysis) of the purified product as a slightly yellow liquid; $n_D^{26}$ 1.5239; equivalent wt. (HClO$_4$/HOAc), 260.7 (calc'd, 261.3). Analysis by G.L.C. shows 98–99% purity. The infrared and N.M.R. spectra are consistent with the expected structure.

*Analysis.*—Calc'd for $C_{15}H_{19}NO_3$: C, 68.95%; H, 7.33%; N, 5.36%. Found: C, 68.93%; H, 7.44%; N, 5.53%.

(4) The apparatus described in (1) above is employed. A solution of 290 g. (0.50 mole) of the material prepared in (C)(a) above, 250 g. (2.5 moles) of methyl methacrylate, 1.0 g. of p-methoxyphenol and 0.5 g. of bis-(p-hydroxyphenyl)amine is heated to reflux and 25 ml. of distillate is collected. Tetraisopropyl titanate, 1.3 g. (4.5 millimoles), is added followed by an additional 0.6 g. (2.3 millimoles) after 1.25 hours. At 2.0 hours 14.0 ml. of distillate B.P. 64–80° is collected. At the end of 3.0 hrs. an additional 52 ml. of distillate, B.P. >90° is obtained. Methyl methacrylate, 100 g. is added and distillation continued for 0.5 hr. using no take-off temperature limit (final solution temp. 121°); a total of 133 ml. of distillate is obtained. The major portion of excess methyl methacrylate is removed by stripping under reduced pressure. A final stripping on a wiping film still at 125°/3.0–0.8 mm. affords 378.5 g. of the product,

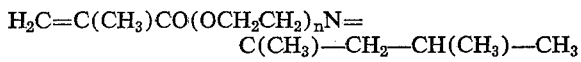

in which $n$ has an average value of 11, as a viscous, dark orange colored liquid; $n_D^{26}$, 1.4691; M.P. —6 to +2°; equivalent wt. (HClO$_4$/HOAc), 724 (calc'd, 652). The infrared and N.M.R. spectra are consistent with the expected composition.

*Analysis.*—Calc'd for $C_{32}H_{61}NO_{12}$: C, 58.96%; H, 9.43%; N, 2.15%. Found: C, 58.75%; H, 9.52%; N, 1.99%.

(5) A solution of 273.5 g. (0.50 mole) of the material obtained in (C)(b) above, 250 g. (2.5 moles) of methyl methacrylate 1.0 g. of p-methoxyphenol and 0.5 g. of bis-(p-hydroxyphenyl)amine is heated to reflux and 16 ml. of distillate is collected. Tetraisopropyl titanate, 4.0 g. (14 millimoles), is then added. Over a 5-hr. period 67 ml. of distillate is collected, B.P. 64 to 90°. Additional methyl methacrylate, 100 g. (1.0 mole) is added and distillation continued. Over 3.5 hrs. 44 ml. of distillate, B.P. 64–95° is collected. Continued distillation produces 63 ml. of distillate, B.P. 95–102° over an additional 1.5 hrs. and a final solution temperature of 124°. The reaction solution is stripped at 125°/2 mm.; 318.9 g. of the product, $$H_2C=C(CH_3)CO(OCH(CH_3)CH_2)_nOCH_2$$
$$CH(CH_3)N=C(CH_3)CH_2CH(CH_3)CH_3$$

in which $n$ has an average value of about 7.4, as a dark colored viscous liquid is obtained. A small amount of insoluble liquid phase which is present is removed by employing filtration (suction) through asbestos filter-aid; $n_D^{26}$, 1.4560; equivalent wt. (HClO$_4$/HOAc), 714 (calc'd 656).

*Analysis.*—Calc'd for $C_{35.2}H_{67.5}NO_{9.4}$: C, 64.5%; H, 10.4%; N, 2.14%. Found: C, 63.3%; H, 10.0%; N, 2.24%.

(6) A solution of 155 g. (50.0 millimoles) of the material prepared in (C)(c), 100 g. (1.0 mole) of methyl methacrylate, 0.1 g. of p-methoxyphenol, 0.1 g. bis-(p-hydroxyphenyl) amine and 0.14 g. of tetraisopropyl titanate is heated to reflux. The distillate (274 g.) is collected over approximately a 6.5-hr. period. The solution temperature is maintained below 125° by periodically (approximately every 45 min.) adding methyl methacrylate in an amount equal to the quantity of distillate removed. At the fifth hour an additional 0.28 g. of tetraisopropyl titanate is added. The solution is concentrated under reduced pressure and stripped at 70°/0.15 mm. There is obtained 151.8 g. of the product

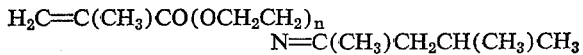

in which $n$ has a value of about 68, as a brown waxy solid having a M.P. of 36–8°. Titration (HClO$_4$/HOAc) shows an equivalent weight of 3896 (calc'd, 3361).

*Analysis.*—Calc'd for $C_{146}H_{289}NO_{69}$: C, 55.4%; H, 9.21%; N, 0.44%. Found: C, 55.4%; H, 8.93%; N, 0.44%.

(7) A solution of 168 g. (0.15 mole) of the material prepared in (D) above, 120 g. (1.2 moles) of methyl methacrylate, 0.3 g. of p-methoxyphenol, 0.3 g. of bis-(p-hydroxyphenyl) amine and 0.4 g. (1.3 millimoles) of tetraisopropyl titanate is heated to reflux, employing essentially the apparatus described in (1) above. The distillate (approximately 200 g.) is collected over a 6.5-hr. period. During this time the solution temperature is maintained between 115° and 125° by the periodic addition of methyl methacrylate in an amount equal to the distillate obtained. The reaction solution is concentrated under reduced pressure and then stripped at 125°/1.0 mm. (employing a wiping film still) yielding 164.7 g. of N-benzylidene)polydiglycolamine methacrylate of the formula $$H_2C=C(CH_3)CO(OCH(CH_3)CH_2)_nOCH_2$$
$$CH(CH_3)N=C(H)(C_6H_5)$$

in which $n$ has an average value of about 17.5, as a dark colored viscous liquid; $n_D^{26}$, 1.4663; equivalent wt. (HClO$_4$/HOAc), 1194 (calc'd, 1188).

*Analysis.*—Calc'd for $C_{63.5}H_{116}NO_{18.5}$: C, 64.17%; H, 9.75%; N, 1.20%. Found: C, 63.24%; H, 9.74%; N, 1.12%.

(8) To a stirred mixture of 127.5 g. (95% purity, 0.48 mole) of N-(1,3-dimethylbutylidene)-2-(2-methacryloxyethoxy)ethylamine (see (1) above) and 100 g. of deionized water, cooled to approximately 4°, is added 57.5 g. (0.60 mole) of phosphoric acid (85%) at such a rate that the reaction temperature is maintained below 7°. The resulting white solid mass is slurried in 700 ml. of acetone and filtered. The solid 2-(2-methacryloxyethoxy)ethylammonium dihydrogen phosphate is washed with an additional 200 ml. of acetone, filtered and dried under reduced pressure, wt. 124.4 g. (96.5%). Titration of the unsaturation (BrO$_3^-$/Br$^-$ method) gives an equivalent weight of 280 (calc'd, 271). Recrystallization from methanol affords a material which gives an average equivalent wt. of 274.

*Analysis.*—Calc'd for $C_8H_{18}NO_7P$: C, 35.43%; H, 6.69%; N, 5.10%; P, 11.42%. Found: C, 35.41%; H, 6.78%; N, 5.13%; P, 11.39%.

(9)(a) Procedure (1) is repeated except that 5 moles (500 g.) of ethyl acrylate is used instead of the 5 moles of methyl methacrylate, producing thereby N-(1,3-dimethylbutylidene)-2-(2-acryloxyethoxy)ethylamine.

(b) N-(benzylidene) - 2 - (2-acryloxyethoxy)ethylamine is prepared by procedure (3) replacing the methyl methacrylate with 5 mols of methyl acrylate.

(10)(a) To a stirred mixture of 25 g. of the product of procedure (9)(b) and 40 g. of deionized water, there is added slowly and while cooling 9.8 g. of concentrated (85%) sulfuric acid. After 10 minutes standing to complete hydrolysis, the aqueous layer is separated from the upper methyl isobutyl ketone layer and diluted with 100 g. of water.

(b) Then 0.2 g. of potassium persulfate is added and the solution heated to 40° while agitating. After eight hours, a viscous solution of a homopolymer is obtained which is useful as a flocculant for suspended matter in all sorts of aqueous systems, of either acid, neutral, or alkaline character, to aid sedimentation and decantation or filtration thereof. This flocculant may be added to such aqueous systems in amounts ranging from 0.01 to 3% based on the weight of suspended matter therein.

(c) The polymer obtained in salt form in part (b) is converted to free base form by adding a mole of caustic soda or of ammonium hydroxide for each mole of polymer salt units.

(11) Procedure (1) is repeated except that the imine there used is replaced with 1 mole of N-(1-ethylpropylidene)-2-(2-hydroxyethoxy)ethylamine (the Schiff base of diethylketone and diglycolamine), thereby producing N - (1-ethylpropylidene)-2-(2-methacryloxyethoxy)ethylamine.

(12) N - (cyclohexylidene)-2-(2-methacryloxyethoxy) ethylamine may be obtained by repeating procedure (1) except that the imine there used is replaced by 1 mole of N-(cyclohexylidene)-2-(2-hydroxyethoxy)ethylamine.

(13) Homopolymer of 2-(2-methacryloxyethoxy)ethylammonium dihydrogen phosphate—To a stirred mixture of 25.5 g. (0.10 mole) of N-(1,3-dimethylbutylidene)-2-(2-methacryloxyethoxy)ethylamine and 40.0 g. of deionized water is added with cooling 11.5 g. (0.10 mole) of concentrated phosphoric acid (85–87%). After allowing the mixture to stand for approximately 10 minutes during which hydrolysis occurs, the lower aqueous layer is separated from the upper methyl isobutyl ketone layer and diluted with 110 g. of water. Potassum persulfate (0.25 g.) and 0.2 ml. of a 1.3% aqueous mercaptoethanol solution (0.01% based on monomer) are added and the stirred solution heated to 40°. During the heating period, a slow stream of nitrogen is passed through the solution in order to remove residual ketone. After four hours the solution is allowed to cool and stand at ambient temperature for approximately 16 hours. Subsequent dilution with 100 g. of water gives an extremely viscous physical gel. Drying an aliquot amount shows 9.0% solids (calc'd. 9.8). A 1% solution gives a Brookfield viscosity of 278 centipoises and a pH of 4.42.

The coagulative effectiveness of this material is excellent based on a standard evaluation procedure. It is accordingly useful for the flocculation of suspended matter in industrial wastes, domestic sewages, and surface waters to aid in sedimentation and decantation or filtration thereof. For these purposes, 0.01 to 3% by weight based on the weight of suspended matter may be mixed with agitation into the suspension.

(14) An aqueous dispersion of an emulsion polymer is prepared in the following manner: A stabilized emulsion consisting of 132 g. of ethyl acrylate (inhibited), 64 g. of methyl methacrylate, 4.0 g. of N-(1,3-dimethylbutylidene)-2-(2-methacryloxyethoxy)-ethylamine, 570 g. of deionized water, 17.1 g. of a 70% aqueous solution of di-isobutylphenoxypoly(40) ethoxyethanol and 2.0 ml. of a solution containing 0.1% $FeSO_4 \cdot 7H_2O$ and 0.1% Versene (tetrasodium salt of ethylenediamine tetracetic acid) is cooled with stirring to 15°. Polymerization is initiated by the addition of 0.2 g. $(NH_4)_2S_2O_8$ in 10 ml. of water and 0.2 g. of sodium hydrosulfite in 10 ml. of water, and by the later (20 min.) addition of sodium formaldehyde sulfoxylate and tert.-butylhydroperoxide. The ensuing exotherm produces a maximum temperature of 60° after which the latex is allowed to cool. In the resulting dispersed polymer, the imine is largely hydrolyzed to a primary amine. Hence, the resulting dispersion containing a copolymer of about 66% ethyl acrylate, 32% methyl methacrylate, and about 2% of 2-(2-methacryloxyethoxy) ethylamine is concentrated by evaporation at amibent temperatures to a total solids content of 47.5% (pH 9.5). The functional monomer incorporation, based on nitrogen analysis of the isolated polymer, is 87.3%.

Air dried films of the polymer dispersion deposited on alkyd, wood and stainless steel substrates show good to excellent adhesion thereto, apparently the result of amine content in the film polymer, since analogous copolymers free of amine show comparatively less adhesion.

(15) An imine copolymer consisting of 58.2 parts butyl methacrylate, 38.8 parts methyl methacrylate and 3.0 parts of N - (1,3 - dimethylbutylidene)-2-(2-methacryloxyethoxy-ethylamine is prepared in the following manner: A solution of 203.7 g. of butyl methacrylate, 135.8 g. of methyl methacrylate, 10.5 g. of the aforesaid imine, and 1.4 g. (0.4% of monomer charge) of azobisisobutyronitrile (AIBN) is added over a 2-hour period to 233.0 g. of toluene, maintained at 90°, with stirring. The resulting solution is heated with stirring for an additional five hours. At the end of the fourth, fifth and sixth hours 0.64 g. of AIBN in 17.7 g. of toluene is added. After a total period of 7 hours, heating is discontinued and 164 g. of toluene is added. The resulting solution has a solids content of 42.5% indicating a conversion of 97.6%.

A solution containing 40% solids is prepared by dilution of 780.0 g. of the solution with 49.0 g. of toluene. This solution gives a Brookfield viscosity of 283 cps. (24°). Films thereof cast on steel, aluminum and oleoresinous primer and baked at 150° for 15 minutes show excellent adhesion to these substrates. While it is not positively known whether the imine in this solution copolymer remains as such in the film or is partially or completely hydrolyzed to form a primary amine group, it is suspected that a partial hydrolysis occurs and may account for the outstanding adhesion qualities.

(16) Procedure (14) is repeated using as the monomer mixture 120 g. butyl acrylate, 30 g. methyl methacrylate, 30 g. vinylidene chloride and 10 g. N-(benzylidene)-2-(2-acryloxyethoxy)ethylamine giving a dispersed copolymer of about 64% butyl acrylate, 16% methyl methacrylate, 16% vinylidene chloride and about 4% of 2-(2-acryloxyethoxy)ethylamine. This dispersion on either the acid or basic side or in neutral condition, is useful as a coating and impregnating composition and shows excellent adhesion to various substrates and especially bare wood, bare steel, alkyd-primed wood or steel, and such substrates carrying weathered coatings of oleoresinous and/or alkyd-type paints or enamels. The polymer dispersion may be made up with pigments, extenders, and other materials in customary fashion to form valuable waterbase paints for either interior or exterior use.

(17) Procedure (14) is repeated using as the monomer mixture 85 g. ethyl acrylate, 30 g. vinyltoluene, 15 g. acrylonitrile, 25 g. 2-ethylhexyl acrylate, 15 g. methyl methacrylate, 5 g. 2-hydroxyethyl acrylate, and 7 g. of the monomeric product of procedure (5) thereby producing a 47% solids dispersion in water of a copolymer consisting essentially of about 47% ethyl acrylate, 16.4% vinyltoluene, 8.2% acrylonitrile, 13.6% 2-ethylhexyl acrylate, 8.2% methyl methacrylate, 2.8% 2-hydroxyethyl acrylate and 3.8% of $$H_2C=C(CH_3)CO(OCH(CH_3)CH_2)_n$$
$$OCH_2CH(CH_3)NH_2$$

This polymer dispersion may be used directly or on dilution to about 25% solids content for the bonding of nonwoven fabrics. Thus, 40 to 100% of polymer solids, based on fiber, may be applied in conjunction with an acidic catalyst, such as 0.5% (based on polymer weight) of ammonium chloride. On drying and curing by heating to 150° for five minutes, the bonded fabric is resistant to washing and dry-cleaning.

This composition may also be made into a water-base paint in the usual fashion. Films obtained from such a paint show good adhesion to wood, alkyds, steel, and oleoresinous coatings.

(18) (a) N - (1 - methylbenzylidene) - 2 - (2 - hydroxyethoxy)-ethylamine is prepared as follows: A solution of 360.6 g. (3.0 moles) of acetophenone, 315.6 g. of diglycolamine and 300 ml. of toluene is refluxed for a period of approximately 12 hrs. During this time 57 ml. of an azeotropic phase is collected, $n_D{}^{26}$ 1.3609. The solution is stripped under reduced pressure and distilled; the fraction, B.P. 138°/0.4 mm., $n_D{}^{26}$ 1.5462, 245.7 g. (37% yield based on analysis) is collected. Analysis by G.L.C. shows approximately 93–4% purity. Titration (HClO₄/HOAc) gives an equivalent weight of 212.1 (calc'd, 207.3).

*Analysis.*—Calc'd for $C_{12}H_{17}NO_2$: C, 69.53%; H, 8.27%; N, 6.76%. Found: C, 69.35%; H, 8.20%; N, 6.77%.

(b) A mixture of 207.3 g. (0.94 mole based on 94% purity) of N-(1-methylbenzylidene)-2-(2-hydroxyethoxy) ethylamine, 500 g. of methyl methacrylate, 2.6 g. of N,N'-diphenyl-p-phenylenediamine and 3.0 ml. (2.84 g., 10 millimoles) of tetraisopropyltitanate is charged to the same apparatus as described in (1) above. The procedure employed in (1) above is also applied to this reaction mixture. A total of 247 g. of distillate is collected. The reaction solution is stripped under reduced pressure affording 268.2 g. of liquid product. Subsequent distillation of this material at 200°/0.7 mm. provided 227.8 g. (82% yield based on G.L.C. analysis) of N-(1-methylbenzylidene)-2-(2-methacryloxyethoxy)ethylamine as a yellow colored liquid; $n_D^{26}$ 1.5238. G.L.C. analysis shows approximately 93% purity. Titration (HClO₄/HOAc) gives an equivalent weight of 282.2 (calc'd, 275.4).

*Analysis.*—Calc'd for $C_{16}H_{21}NO_3$: C, 69.79%; H, 7.69%; N, 5.09%. Found: C, 69.74%; H, 7.53%, N, 5.00%.

(c) Procedure (14) is repeated using the following mixture of monomers in the stabilized emulsion:

|   | G. |
|---|---|
| Ethyl acrylate | 130 |
| Methyl methacrylate | 60 |
| Monomer of part (b) hereof | 5 |
| Methacrylic acid | 4 |

The polymer dispersion obtained is pigmented to form a water-base paint. The paint forms air-dried films having good adhesion to steel, wood, and previously painted weatherbeaten surfaces.

I claim:

1. A compound of the formula

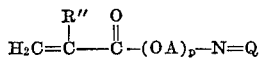

wherein:
R" is H or methyl,
Q is

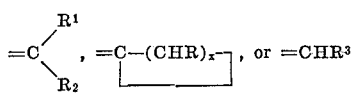

R is H or, in one CHR unit, it may be methyl,
R¹ is a (C₁–C₁₂)alkyl or cyclohexyl group,
R² is a (C₁–C₁₂)alkyl or cyclohexyl group,
R₃ is a (C₁–C₁₂)alkyl, cyclohexyl, phenyl, halophenyl, or a (C₁–C₂)alkoxyphenyl group,
(OA)ₚ is a chain of 2 to 200 oxyalkylene groups OA of the formula

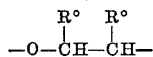

R° being H or a (C₂–C₂)-alkyl group, in which chain R° may be the same throughout its length or R° may be H in some of the OA groups and an alkyl group in others.

2. The acrylate or methacrylate of N-(benzylidene)-2-(2-hydroxyethoxy)ethylamine.

3. The acrylate or methacrylate of N-(1,3-dimethylbutylidene)-2-(2-hydroxyethoxy)ethylamine.

4. A polymer of the compound defined in claim 1.

5. A copolymer of ½ to 99½% by weight of a compound of claim 1 and at least one other monoethylenically unsaturated compound having a group of the formula $H_2C=C<$.

6. A copolymer of ½ to 99½% by weight of a compound of claim 1 and at least one monomer selected from the group consisting of vinyl acetate, acrylonitrile, acrylamide, methacrylamide, styrene, vinyltoluene, vinylidene chloride, vinyl chloride, vinyl laurate, and esters of acrylic acid or methacrylic acid having from 1 to 18 carbon atoms in the alcohol moiety.

7. A copolymer of ½ to 99½% by weight of a compound of claim 1 and at least one ester of acrylic acid or methacrylic acid having from 1 to 18 carbon atoms in its alcohol moiety.

8. A copolymer, or a salt thereof, of ½ to 15% by weight of a compound of the formula

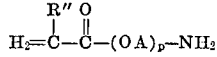

wherein:
R" is H or CH₃ and
(OA)ₚ is a chain of 2 to 200 oxyalkylene groups OA of the formula

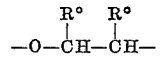

R° being H or a (C₁–C₂)-alkyl group, in which chain R° may be the same throughout its length or R° may be H in some of the OA groups and an alkyl group in others and at least one monomer selected from the group consisting of vinyl acetate, acrylonitrile, acrylamide, methacrylamide, styrene, vinyltoluene, vinylidene chloride, vinyl chloride, vinyl laurate and esters of acrylic acid or methacrylic acid having from 1 to 18 carbon atoms in the alcohol moiety.

9. A copolymer, or a salt thereof, of ½ to 15% by weight of a compound of the formula

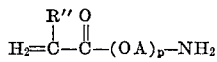

wherein:
R" is H or CH₃ and
(OA)ₚ is a chain of 2 to 10 oxyalkylene groups OA of the formula

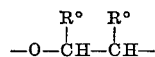

R° being H or a (C₁–C₂)-alkyl group, in which R° may be the same throughout its length or R° may be H in some of the OA groups and an alkyl group in others and at least one monomer selected from the group consisting of vinyl acetate, acrylonitrile, acrylamide, methacrylamide, styrene, vinyltoluene, vinylidene chloride, vinyl chloride, vinyl laurate and esters of acrylic acid or methacrylic acid having from 1 to 18 carbon atoms in the alcohol moiety.

10. A copolymer, or a salt thereof, of ½ to 15% by weight of a compound of the formula

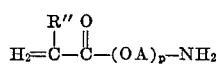

wherein:
R" is H or CH₃ and
(OA)ₚ is a chain of 2 to 200 oxyalkylene groups OA of the formula

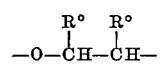

R° being H or a (C₁–C₂)-alkyl group, in which chain R° may be the same throughout its length or R° may be H in some of the OA groups and an alkyl group in others and at least one ester of acrylic acid or methacrylic acid having from 1 to 18 carbon atoms in its alcohol moiety.

11. A copolymer, or a salt thereof, of ½ to 15% by weight of a compound of the formula

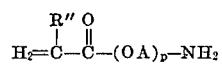

wherein:

R″ is H or CH$_3$ and (OA)$_p$ is a chain of 2 to 10 oxyalkylene groups OA of the formula

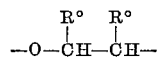

R° being H or a (C$_1$–C$_2$)-alkyl group, in which chain R° may be the same throughout its length or R° may be H in some of the OA groups and an alkyl group in others and at least one ester of acrylic acid or methacrylic acid having from 1 to 18 carbon atoms in its alcohol moiety.

12. A copolymer of (a) ½ to 15% by weight of 2 - (2 - methacryloxyethoxy)ethylamine or of 2-(2-acryloxyethoxy)-ethylamine and (b) at least one other monoethylenically unsaturated monomer having a group of the formula H$_2$C=C<.

13. A copolymer as defined in claim 12 comprising in the polymer molecules at least one ester of acrylic acid or methacrylic acid having from 1 to 18 carbon atoms in its alcohol moiety.

14. A copolymer of ½ to 15% by weight of

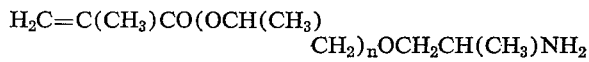

in which $n$ has an average value of about 7.4 and at least one other monoethylenically unsaturated monomer having a group of the formula H$_2$C=C<.

15. A copolymer of (a) ½ to 15% by weight of 2-(2 - methacryloxyethoxy)ethylamine or of 2-(2-acryloxyethoxy)ethylamine and (b) at least one monomer selected from the group consisting of vinyl acetate, acrylonitrile, acrylamide, methacrylamide, styrene, vinyltoluene, vinylidene chloride, vinyl chloride, vinyl laurate, and esters of acrylic acid or methacrylic acid having from 1 to 18 carbon atoms in the alcohol moiety.

16. A copolymer of (a) ½ to 15% by weight of 2-(2-methacryloxyethoxy)ethylamine or of 2 - (2 - acryloxyethoxy)ethylamine and (b) at least one ester of acrylic acid or methacrylic acid having from 1 to 18 carbon atoms in its alcohol moiety.

17. A copolymer of ½ to 15% by weight of

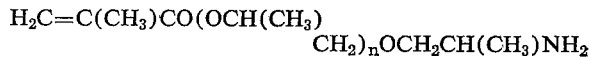

in which $n$ has an average value of aout 7.4 and at least one monomer selected from the group consisting of vinyl acetate, acrylonitrile, acrylamide, methacrylamide, styrene, vinyltoluene, vinylidene chloride, vinyl chloride, vinyl laurate, and esters of acrylic acid or methacrylic acid having from 1 to 18 carbon atoms in the alcohol moiety.

18. A copolymer of ½ to 15% by weight of

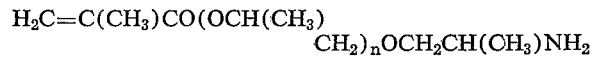

in which $n$ has an average value of about 7.4 and at least one ester of acrylic acid or methacrylic acid having from 1 to 18 carbon atoms in its alcohol moiety.

19. A copolymer of (a) ½ to 15% by weight of the acrylate or methacrylate of N-(benzylidene)-2-(2-hydroxyethoxy)ethylamine and (b) at least one other monoethylenically unsaturated monomer having a group of the formula H$_2$C=C<.

20. A copolymer of (a) ½ to 15% by weight of the acrylate or methacrylate of N-(benzylidene)-2-(2-hydroxyethoxy)ethylamine and (b) at least one monomer selected from the group consisting of vinyl acetate, acrylonitrile, acrylamide, methacrylamide, styrene, vinyltoluene, vinylidene chloride, vinyl chloride, vinyl laurate and esters of acrylic acid or methacrylic acid having from 1 to 18 carbon atoms in the alcohol moiety.

21. A copolymer of (a) ½ to 15% by weight of the acrylate or methacrylate of N-(1,3 - dimethylbutylidene)-2-(2-hydroxyethoxy)ethylamine and (b) at least one other monoethylenically unsaturated monomer having a group of the formula H$_2$C=C<.

22. A copolymer of (a) ½ to 15% by weight of the acrylate or methacrylate of N-(1,3 - dimethylbutylidene)-2-(2-hydroxyethoxy)ethylamine and (b) at least one monomer selected from the group consisting of vinyl acetate, acrylonitrile, acrylamide, methacrylamide, styrene, vinyltoluene, vinylidene chloride, vinyl chloride, vinyl laurate and esters of acrylic acid or methacrylic acid having from 1 to 18 carbon atoms in the alcohol moiety.

References Cited

UNITED STATES PATENTS

| | | | |
|---|---|---|---|
| 2,103,265 | 12/1837 | Lott | 260—486 |
| 2,824,861 | 2/1958 | Conbere et al. | 260—486 |
| 3,308,081 | 3/1967 | Glabisch. | |
| 3,037,969 | 6/1962 | Hankins et al. | |

HARRY WONG, JR., Primary Examiner

U.S. Cl. X.R.

117—123, 126, 128.4, 138.8, 139.5, 142, 148, 155; 252—51; 260—80.8, 80.73, 80.81, 85.5, 86.3, 86.7, 89.5, 486, 836, 844, 851